No. 630,581. Patented Aug. 8, 1899.
V. BÉLANGER.
END THRUST BEARING.
(Application filed May 12, 1898.)
(No Model.)
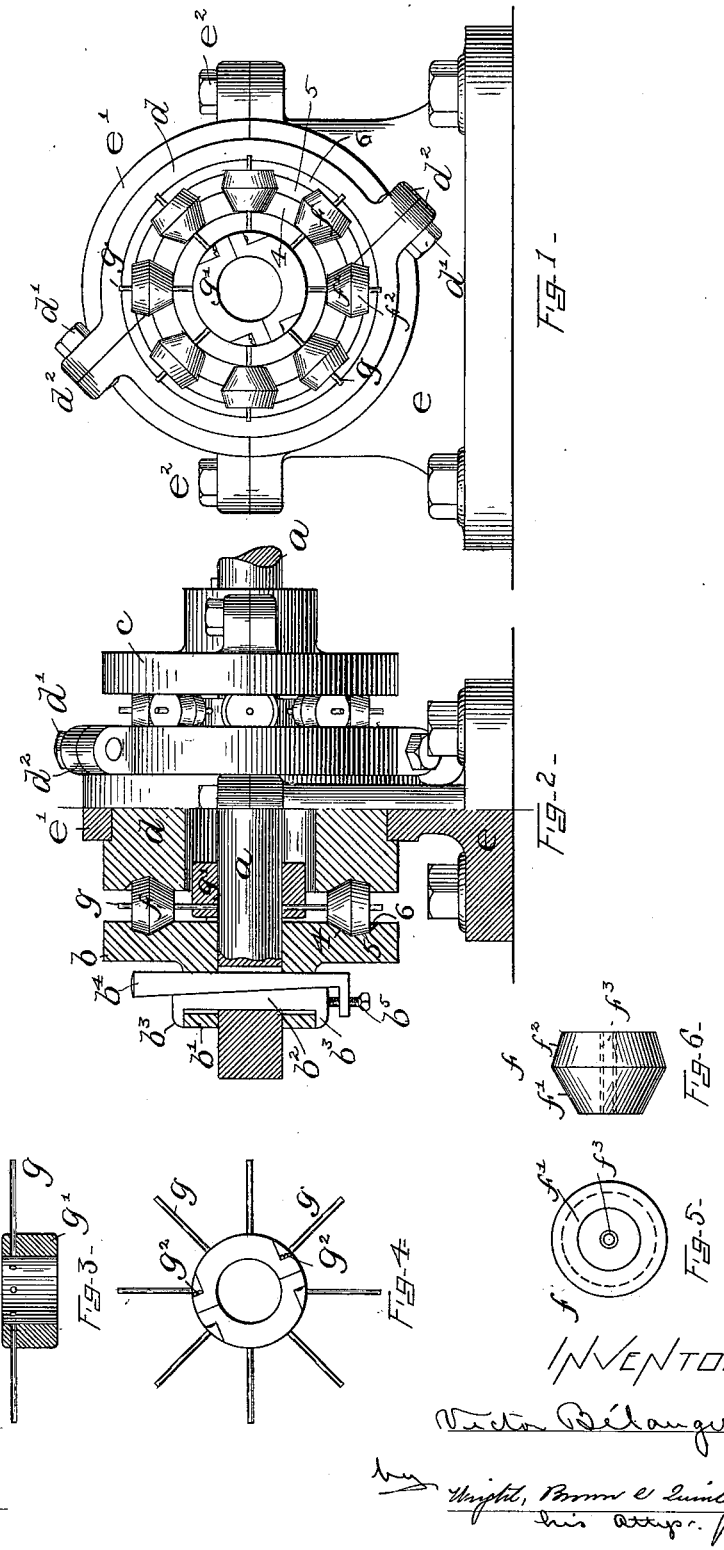

UNITED STATES PATENT OFFICE.

VICTOR BÉLANGER, OF BOSTON, MASSACHUSETTS, ASSIGNOR TO JOSIAH QUINCY, TRUSTEE, OF SAME PLACE.

END-THRUST BEARING.

SPECIFICATION forming part of Letters Patent No. 630,581, dated August 8, 1899.

Application filed May 12, 1898. Serial No. 680,462. (No model.)

*To all whom it may concern:*

Be it known that I, VICTOR BÉLANGER, of Boston, in the county of Suffolk and State of Massachusetts, have invented certain new and useful Improvements in End-Thrust Bearings, of which the following is a specification.

This invention has relation to end thrusts for shafts or other rotating parts, and has for its object to provide an improved bearing of the type specified which will serve with greater efficiency than heretofore as an abutment for a rotary shaft, such as a propeller-shaft of a steamship, or other rotating member against which a strong endwise thrust is maintained.

To these ends the invention consists of a device such as illustrated upon the drawings and now to be described in detail, and finally pointed out in the claims.

Reference is to be had to the accompanying drawings, and to the letters and figures marked thereon, forming a part of this specification, the same letters and figures designating the same parts or features, as the case may be, wherever they occur.

Of the drawings, Figure 1 represents the bearing in front elevation with the shaft removed. Fig. 2 represents a partial longitudinal section through the same and a partial front elevation. Figs. 3 and 4 represent the spider or device which supports the roll. Figs. 5 and 6 represent the roll.

Referring to the drawings, $a$ indicates the rotary shaft which it is desired to hold against axial movement and to which is secured a flanged collar or member $b$, formed in two sections bolted together. Through an enlarged slot in the shaft and through the hub $b'$ of the member $b$ is passed a key $b^2$, having lips $b^3$ on its ends, which take over the periphery of the hub. The rear edge of the key is inclined relatively to its front edge, which rests against the end wall of the slot in the shaft, and between the said rear edge and the end wall of the slot in the hub is placed a wedge $b^4$, having its lower end bent at an angle to receive an adjusting-screw $b^5$, which bears against the key. By adjusting the screw $b^5$ the collar $b$ is moved along the shaft $a$. Upon the end of the shaft is secured another flanged collar $c$, likewise formed in two parts bolted together, this collar being, however, incapable of axial movement relatively to the shaft. The shaft between the two flanged collars passes loosely through an abutment-ring $d$, confronting said collars or members and formed in two separable halves secured together by bolts $d'$ $d'$, passed through lugs or ears $d^2$, extending outwardly from the periphery thereof at each end. The said ring is rigidly mounted in a pedestal or bracket $e$ and is secured in place by a cap-plate $e'$, the ring having a peripheral circumferential groove into which they extend, whereby it is held against axial movement. Bolts $e^2$ $e^2$ secure the cap-plate to the bracket.

Between the flanged collars or members $b$ and $c$ and the confronting stationary member or abutment $d$, which confronts them, are placed rolls $ff$, of which there are as many as may be desired. Each roll tapers from its center toward its ends, one end portion $f'$ being tapered to a greater degree and being longer than the other portion $f^2$. The rolls travel in V-shaped grooves in the confronting portions of the abutment and the flanged collars, said grooves having walls 4 and 5, against which the portions $f'$ $f^2$ respectively bear, the said portions $f'$ extending inward radially of the shaft. Each groove has a wall 6 at an angle to the wall 5 to form a shoulder to prevent outward or radial movement of the rolls.

To separate or space each set of rolls, they are journaled upon the projecting pins $g$ of a spider having a hub $g'$, the spider being made in two separable portions secured together by bolts $g^2$ $g^2$, as shown in Fig. 4. Each roll has a phosphor-bronze bushing $f^3$, which fits loosely on one of the pins $g$, so that there is very little friction due to the rolls turning on the pins. The hub $g'$ of the spider is loose on the shaft $a$, so that the latter may rotate therein as the spider travels around slowly under the impulse of the rolls.

If the shaft $a$ be employed as the propeller-shaft of a vessel, provision is made by the herein-described device to resist the end thrust in either direction, and as the shaft rotates it is relieved from friction by the rolls which travel around the axis of the shaft.

The parts which are mounted upon or secured to the shaft may all be removed without disturbing the latter or necessitating its being moved either laterally or longitudinally.

Having thus explained the nature of the invention and described a way of constructing and using the same, though without attempting to set forth all of the forms in which it may be made or all of the modes of its use, I declare that what I claim is—

1. An end-thrust bearing comprising an abutment, a confronting member secured to the shaft, said abutment and said member being each provided with V-shaped grooves facing each other, rolls beveled from the center toward the ends to fit in said grooves, and a spider for separating said rolls, said spider consisting of a hub and a plurality of radially-projecting pins free at their outer ends on which the rolls are journaled.

2. An end-thrust bearing comprising an abutment, a confronting member secured to the shaft, said abutment and said member being each provided with V-shaped grooves facing each other, rolls beveled from the center toward the ends to fit in said grooves, and a spider for separating said rolls said spider consisting of a hub formed in two separable sections detachably secured together, and a plurality of radial pins on which said rolls are journaled.

In testimony whereof I have affixed my signature in presence of two witnesses.

VICTOR BÉLANGER.

Witnesses:
MARCUS B. MAY,
A. D. HARRISON.